United States Patent
Wilson et al.

(10) Patent No.: US 8,840,497 B2
(45) Date of Patent: Sep. 23, 2014

(54) PULLEY DEVICE FOR A TENSIONING OR GUIDE ROLLER

(75) Inventors: Pamphile Wilson, Linas (FR); Thierry Prouteau, Saint Cyr sur Loire (FR); Cédric Narbonnais, Argenteuil (FR)

(73) Assignee: Aktiebolaget SKF, Gothenburg (SE)

( * ) Notice: Subject to any disclaimer, the term of this patent is extended or adjusted under 35 U.S.C. 154(b) by 237 days.

(21) Appl. No.: 12/973,421

(22) Filed: Dec. 20, 2010

(65) Prior Publication Data
US 2011/0152025 A1    Jun. 23, 2011

(30) Foreign Application Priority Data

Dec. 23, 2009   (FR) ...................................... 09 59537

(51) Int. Cl.
| F16H 55/36 | (2006.01) |
| F16C 13/00 | (2006.01) |
| F16H 7/20 | (2006.01) |
| F16C 35/073 | (2006.01) |
| F16B 41/00 | (2006.01) |
| F16H 7/08 | (2006.01) |
| F16H 57/00 | (2012.01) |

(52) U.S. Cl.
CPC ............... F16H 7/20 (2013.01); F16C 13/006 (2013.01); F16B 41/002 (2013.01); F16H 2007/0865 (2013.01); F16H 2057/0093 (2013.01); F16C 35/073 (2013.01)
USPC ........................................................ 474/166

(58) Field of Classification Search
USPC ................................................ 474/166, 237
See application file for complete search history.

(56) References Cited

FOREIGN PATENT DOCUMENTS

| DE | 19836191 A1 | 2/2000 | |
| DE | 10003208 B4 | 1/2005 | |
| DE | 102005003844 A1 | 8/2006 | |
| DE | 102007039131 A1 | 2/2009 | |
| EP | 1120584 A1 | 8/2001 | |
| WO | W02007036407 A1 | 4/2007 | |
| WO | WO 2007036407 A1 * | 4/2007 | ................ F16H 7/20 |
| WO | WO 2010006857 A1 * | 1/2010 | ................ F16H 7/20 |

* cited by examiner

Primary Examiner — William E Dondero
Assistant Examiner — Diem Tran
(74) Attorney, Agent, or Firm — Bryan Peckjian; SKF USA Inc. Patent Department

(57) ABSTRACT

A pulley device for a belt or chain tensioning or guide roller includes a pulley, a rolling bearing, and a spacer configured to support the rolling bearing and having a transverse mounting surface disposable against an external element. An attachment member includes a threaded portion with an outer diameter and a retaining ring is disposed on the attachment member and retains the attachment member axially relative to the spacer. The ring has an inner diameter lesser than the outer diameter of the threaded portion in a free state and opening such that the ring is radially deflectable. Preferably, the spacer has a recess extending from the mounting surface defined by a frustaconical surface tapering outwardly toward the mounting surface and a shoulder extending inwardly from the frustoconical surface, the ring being deflectable radially inwardly by the recess so as to be disposed generally against the shoulder of the recess.

18 Claims, 2 Drawing Sheets

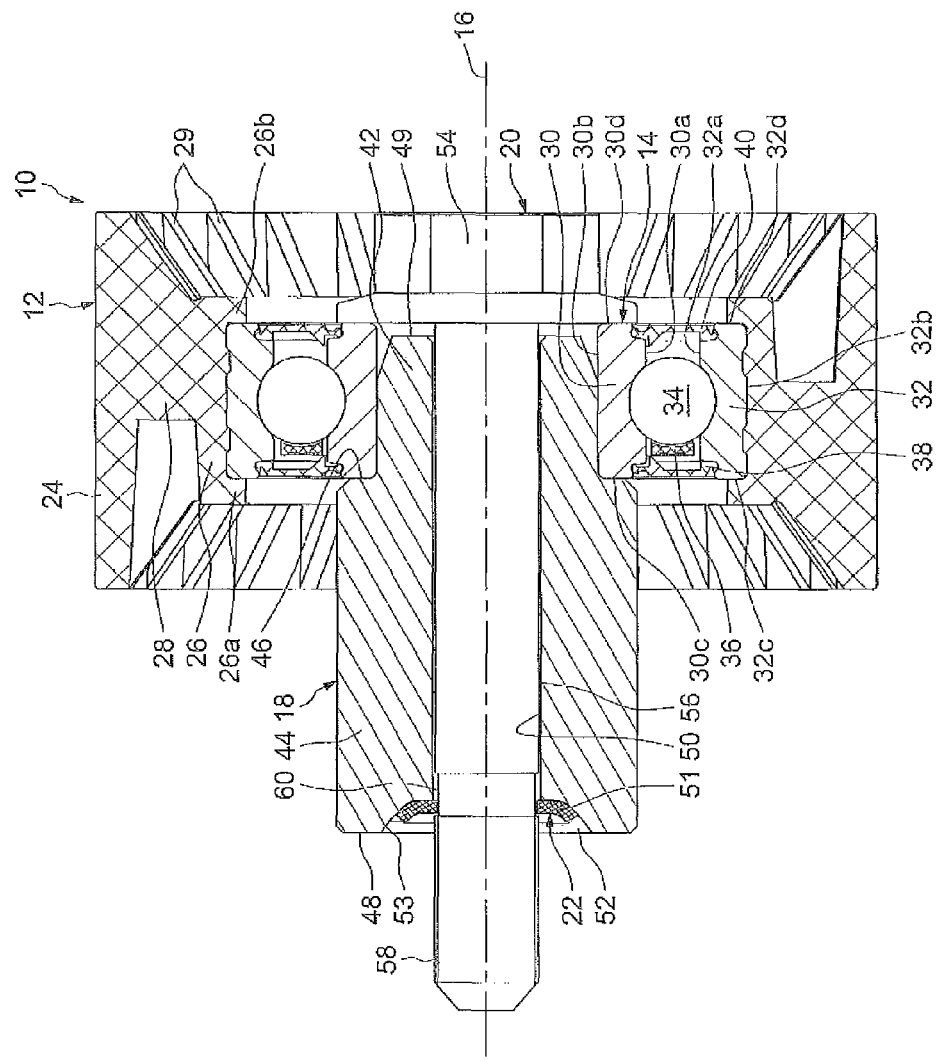

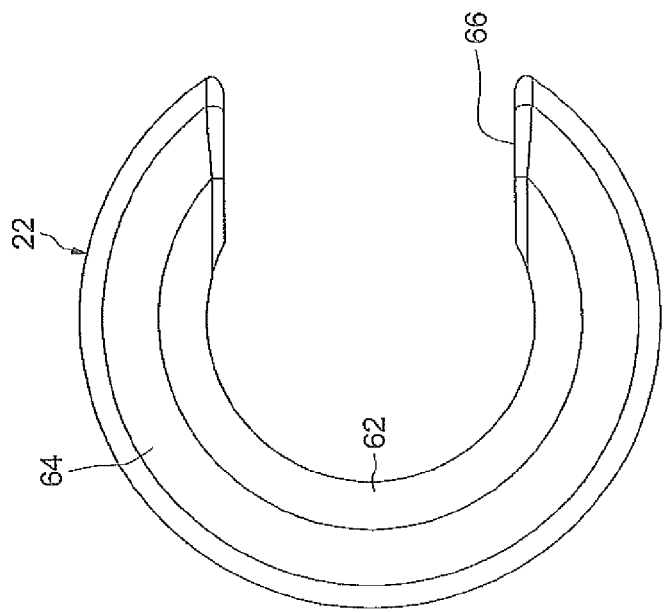
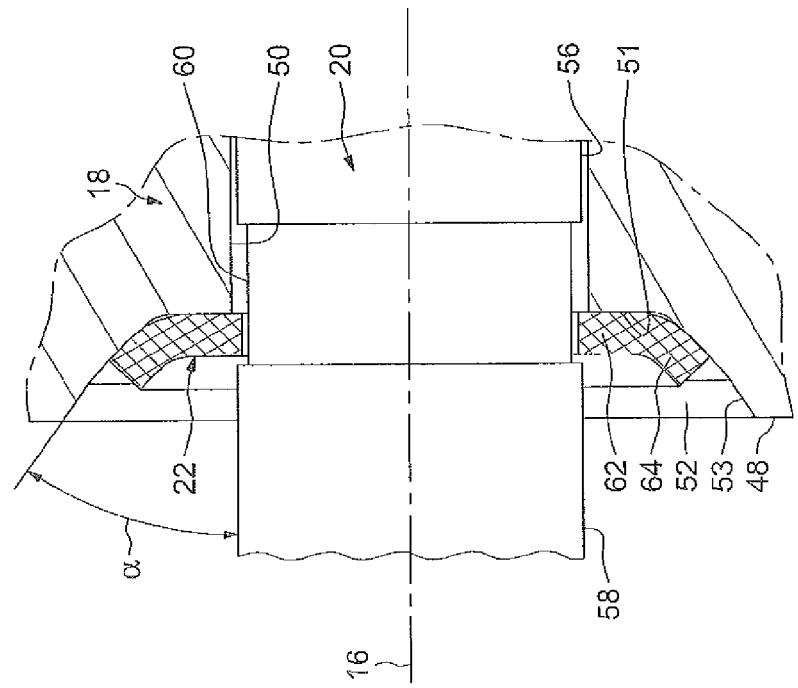

PULLEY DEVICE FOR A TENSIONING OR GUIDE ROLLER

CROSS-REFERENCE TO RELATED APPLICATIONS

This application claims priority to French Patent Application No. 095937, filed on Dec. 23, 2009, which is incorporated fully herein by reference.

BACKGROUND OF THE INVENTION

The present invention relates to the field of pulley devices for tensioning or guide rollers provided to interact with a chain or a belt, for example a timing belt of a motor vehicle internal combustion engine.

Such rollers are usually used to maintain a tension at all times on the belt or the chain within a determined range or to locally modify the path taken by the latter. These are then called respectively tensioning rollers or guide rollers. In guide rollers, the pulley is mounted so as to rotate on a screw or a spindle by means of a rolling bearing, the roller then being attached directly or indirectly to the engine block or to an element of a tensioning roller device, for example an articulated arm or an eccentric.

In order to attach the roller to its support, a spacer is usually used in association with the said screw or spindle. During this mounting, it is desirable that the spindle or the screw is axially secured to the other elements forming the roller and comprising the pulley. This provides an inseparable assembly, that is easy to handle and transport and can be easily mounted.

For this purpose, document WO-A1-2007/036407 discloses a pulley device for a tensioning roller comprising a pulley, a rolling bearing, a flange capable of resting against an element outside the device, an attachment screw axially immobilized relative to the flange, and a friction ring provided between the flange and the screw. The flange described in this document does not make it possible to easily achieve the attachment of the device against the engine block.

Also known, through document DE-B4-100 03 208, is a pulley for a belt tensioning roller comprising a rolling bearing, a spacer for the mounting of the rolling bearing and an attachment screw axially immobilized relative to the spacer. The relative axial retention of the attachment screw and of the spacer is achieved by means of a continuous ring clamped onto a threaded portion of the attachment screw.

The major drawback of this solution is that it does not allow a particularly sure and effective retention of the attachment screw relative to the spacer. There is therefore a risk of accidental separation of the elements constituting the pulley device. Moreover, the operation of clamping the ring onto the threaded portion of the screw can be awkward to achieve.

SUMMARY OF THE INVENTION

The object of the present invention is to remedy these drawbacks.

More particularly, the object of the present invention is to provide a pulley device for a belt or chain tensioning or guide roller that is particularly easy to manufacture, assemble and mount and that can be transported and handled without risk of the elements forming it coming apart.

A further object of the present invention is to provide a device ready to be mounted without particular preparation onto the support provided for this purpose.

In one embodiment, a pulley device for a belt or chain tensioning or guide roller comprises a pulley, a rolling bearing, a spacer supporting the rolling bearing and comprising a transverse mounting surface adapted to allow the device to be attached against an external element, an attachment screw that is immobilized axially relative to the spacer and that comprises a threaded portion, and a retaining ring for retaining the relative axial position of the attachment screw and of the spacer. The retaining ring has, in the free or unstressed state, an internal diameter that is smaller than the external diameter of the threaded portion of the attachment screw and is open at a point of its circumference so as to be radially elastic.

Advantageously, the retaining ring is fully mounted inside a recess emerging at the mounting surface and delimited by a peripheral wall widening out in the direction of the said surface. The retaining ring may be formed so as to closely match the shape of the recess.

The retaining ring can be mounted axially resting against a shoulder forming the bottom of the recess of the spacer. Advantageously, the retaining ring comprises a radial portion axially resting against the shoulder and extended outwards by an oblique collar in contact with the peripheral wall of a shape to match the spacer extending the said shoulder.

The retaining ring may extend in radial protrusion inside a groove arranged on the attachment screw. The ring is advantageously capable of interfering radially with at least one lateral edge of the groove. This ensures a good relative axial retention between the screw and the spacer by virtue of the radial interference that exists between the ring mounted inside the groove made on the screw and the spacer. This retention is obtained by abutment contact in the axial direction.

The retaining ring can be made of synthetic material or of metal.

In one embodiment, the spacer extends in axial protrusion relative to the pulley. The spacer preferably has a generally cylindrical shape.

Advantageously, the attachment screw comprises a clamping head resting against the rolling bearing axially on the side opposite to the spacer.

The invention also relates to a method for mounting a pulley device for a belt or chain tensioning or guide roller, in which a subassembly is mounted comprising a pulley, a rolling bearing and a spacer placed at least partly in the bore of the rolling bearing and comprising a transverse mounting surface adapted to allow the device to be attached against an external element, and an attachment screw comprising a groove is inserted into a bore of the spacer until a head of the screw rests against the rolling bearing. A retaining ring that is open at a point of its circumference is deformed by elasticity so as to increase its internal diameter. An external collar of the deformed retaining ring is positioned against a matching peripheral wall of a recess emerging at the mounting surface of the spacer, the said peripheral wall widening outwards, and the said ring is pushed axially into the deformed position so as to press it to the bottom of the recess.

BRIEF DESCRIPTION OF THE SEVERAL VIEWS OF THE DRAWINGS

The present invention will be better understood on studying the detailed description of an embodiment taken as a non-limiting example and illustrated by the appended drawings in which:

FIG. 1 is a view in axial section of a pulley device for a belt or chain tensioning or guide roller according to the invention, FIG. 2 is a detail view of FIG. 1, and FIG. 3 is a front view of a retaining ring of the device of FIG. 1.

DETAILED DESCRIPTION OF THE INVENTION

As can be seen in FIGS. 1 and 2, the pulley device for a belt or chain tensioning or guide roller, referenced 10 in its entirety, comprises a pulley 12, a rolling bearing 14, with a geometric axis 16, a spacer 18 of generally cylindrical shape and an attachment member 20, preferably a screw, coaxial with the axis 16.

In order to secure the attachment member 20 and the spacer 18, the device 10 comprises a retaining ring 22 which is radially deflectable or "elastic" and provided between these two elements as will be described below.

The pulley 12 comprises an external axial portion 24 offering an external surface designed to interact with a belt or a chain (not shown), an internal axial portion 26 and a radial annular intermediate portion 28 connecting the said portions. The external portion 24 and internal portion 26 are coaxial with the axis 16. The internal axial portion 26 comprises two radial rims 26a, 26b directed radially inwards from its axial ends. The radial rims 26a and 26b delimit a bore furnished with annular ribs (not referenced). Stiffening ribs 29 are also provided between the internal axial portion 26 and external axial portion 24 and are connected to the intermediate portion 28.

The rolling bearing 14 comprises an internal ring 30, an external ring 32, a row of rolling elements 34, in this instance made in the form of balls, placed between raceways of the rings, a cage 36 maintaining the circumferential spacing of the rolling elements 34, and two seals 38, 40 that are symmetrical relative to a radial plane passing through the centre of the rolling elements 34.

The internal ring 30 comprises an axial external surface 30a of revolution in which the toroidal raceway for the rolling elements 34 and grooves for producing a contact with the lips of the seals 38, 40 are arranged. The internal ring 30 also comprises a bore 30b partly fitted onto the spacer 18 and delimited by two transverse radial surfaces 30c, 30d.

The external ring 32 is furnished with a bore 32a in which the toroidal raceway for the rolling elements 34 and grooves in which the seals 38, 40 are fitted are arranged. The seals 38, 40 provide a static seal with the rotating external ring 32 and a dynamic seal with the non-rotating internal ring 30. The external ring 32 also comprises an axial external surface 32b of revolution and transverse radial surfaces 32c, 32d that are axially aligned with the radial surfaces 30c, 30d. Annular grooves (not referenced) are arranged on the external surface 32b of the external ring 32 of matching shape with the ribs formed in the bore of the internal portion 26 of the pulley 12.

The pulley 12 is obtained by overmoulding a plastic material such as a polyamide onto the external ring 32. The result of this is an excellent cohesion between these parts, in particular at the grooves of the external ring 32 which the melted plastic material penetrates to form the ribs in the bore of the pulley by matching shape. The production of the pulley 12 by moulding makes it possible to give it complex shapes while maintaining a large degree of lightness and relatively low manufacturing costs. Alternatively, the pulley 12 could be made of metal sheet and fitted onto the external ring 32.

The spacer 18, with its axis 16, comprises a short cylindrical axial portion 42 on which is placed over a portion of its length the internal ring 30 of the rolling bearing 14 and which is extended, at one axial end, by a cylindrical axial portion 44 of larger diameter. An annular radial shoulder 46 is arranged between the axial portions 42, 44 and forms an abutment surface against which the radial surface 30c of the internal ring 30 rests. Axially on the side opposite to the radial shoulder 46, the axial portion 44 is delimited by a transverse radial surface 48 capable of resting against a support (not shown) that is external to the device in order to allow the device to be mounted on and attached to the said support. The support may for example be the engine block, an articulated arm or an eccentric of the associated automatic tensioning roller. The axial portion 44 extends in axial protrusion relative to the pulley 12.

The axial dimension of the axial portion 42 is smaller than that of the internal ring 30 so that a transverse radial surface 49 axially opposite to the radial surface 48 is recessed relative to the radial surface 30d of the internal ring 30. The spacer 18 therefore leaves the radial surface 30d completely free so that it can be used as a reference surface and rest against a completely different surface.

The spacer 42 also comprises a cylindrical bore 50, with an axis 16, through which the attachment member 20 extends. The attachment member 20 can be placed with a greater or lesser radial clearance in the bore 50. The bore 50 extends axially from the radial surface 49 and is extended axially by a recess 52 emerging at the radial mounting surface 48. In other words, the recess 52 is arranged from the radial surface 48. The bore 50 and the recess 52 are separate or connected by a radial shoulder 51. The recess 52 is defined or delimited axially by the shoulder 51 on the one hand and by the radial surface 48 on the other hand. The recess 52 is defined or delimited radially by a peripheral or lateral wall 53 having a generally frustoconical surface that widens or tapers towards the outside and of which the small-diameter internal edge extends the shoulder 51 outwards, the large-diameter external edge being connected to the radial surface 48. Thus, the wall 53 has in this instance a general shape that is substantially frustoconical. The recess 52 has a dish shape that extends along the axis 16 and of which the bottom is formed by the shoulder 51. In cross section, an angle $\alpha$ formed between the axis 16 of the device and the wall 53 may advantageously be between 10 and 50°, and preferably between 30 and 40°, and in particular equal to 35°.

The attachment member 20 comprises a clamping head 54 and a stem furnished with a smooth portion 56 extending from the head and being centred in the bore 50, and with a threaded portion 58 at the opposite end from the head. The threaded portion 58 is in axial protrusion relative to the radial surface 48 of the spacer 18. It is designed to be inserted into a tapped hole arranged in the support external to the device. The head 54 rests against the transverse radial surface 30d of the internal ring 30 left free by the spacer 18.

Axially between the smooth portion 56 and the threaded portion 58, on the external surface of the screw 20, an annular groove or channel 60 is arranged inside which the retaining ring 22 is partly housed. The groove 60 is defined or delimited axially by two opposite radial edges. The axial dimension of the groove 60 is greater than that of the retaining ring 22.

The retaining ring 22 is preferably made in a single piece (i.e., one-piece construction). Advantageously, it can be made from a thin sheet-metal blank by cutting and swaging. Alternatively, the ring 22 can be made by moulding a synthetic material, for example polyoxymethylene (POM). The retaining ring 22 is open at a point of its circumference so as to be radially deflectable and, in cross section, is generally C-shaped, as can be seen in FIG. 3.

The retaining ring 22 comprises an internal radial portion 62 which is extended at a large-diameter edge by an oblique external collar 64 widening towards the outside. The ring 22 also has an opening 66 giving it its general C shape. In the free state (i.e., when the ring 22 is separate from the attachment member 20), the inner diameter of the radial portion 62 is greater than the outer diameter of the groove 60 of the attachment member 20 so that there is a radial clearance between these two elements, and is slightly less than the diameter of the bore 50 and than the diameter of the smooth portion 56 and of the threaded portion 58 of the screw so as to remain axially housed inside the said groove. The radial distance separating the circumferential ends of the ring 22 delimiting the opening 66 is less than the diameter of the groove 60 so as to prevent a movement in the radial direction, or even a separation of the ring from the attachment screw 20.

The radial portion 62 of the ring is mounted axially resting against the shoulder 51 of the spacer 18, and the collar 64 rests against the lateral wall 53 of matching shape extending the said shoulder. The retaining ring 22 is held against the wall 53 and the shoulder 51 of the spacer 18 by friction and pinching. The retaining ring 22 is configured so as to match in shape the shoulder 51 and the wall 53 delimiting the recess 52. Therefore, once mounted inside the recess 52, the retaining ring 22 closely follows the shape of the said recess. The retaining ring 22 is entirely housed inside the recess 52 so as to be axially recessed from the radial surface 48 serving as a reference surface for the mounting of the device 10 against the associated support. In other words, the retaining ring 22 is situated axially recessed inside the spacer 18 relative to the radial surface 48.

Assembling the pulley device 10 is carried out in the following manner.

The spacer 18 is mounted in the bore 30b of the internal ring 30 of the rolling bearing until the shoulder 46 butts against the radial transverse surface 30c of the said ring so as to form a subassembly consisting of the pulley 12, the rolling bearing 14 and the said spacer 18. Then, by pushing axially, the screw 20 is inserted into the bore 50 of the spacer 18 until the head 54 of the said screw rests against the radial transverse surface 30d of the internal ring 30.

The retaining ring 22 is then deformed or deflected radially so as to increase its internal diameter so that it is greater than the diameter of the threaded portion 58 of the attachment screw 20. In this deformed position, the collar 64 of the retaining ring 22 is brought against the lateral wall 53 shaped to match the spacer 18, and then the said ring is pushed axially so as to press its radial portion 62 against the shoulder 51 of the spacer. The retaining ring 22 can then, by elasticity, resume its initial shape inside the groove 60 and interfere radially or diametrally with the lateral edges of the said groove in the event of axial movement of the attachment screw 20 relative to the spacer 18. The retaining ring 22 therefore extends radially both in the groove 60 and the recess 52.

It can be conceived that the groove 60 must be machined at a distance from the head 54 of the screw such that, when the latter comes to butt against the radial surface 30d of the internal ring 30 of the rolling bearing, the lateral edge of the groove situated axially on the side of the threaded portion 58 is offset axially towards the outside relative to the entrance of the recess 52 so as to allow the retaining ring 22 to be mounted axially between the shoulder 51 and the said radial edge of the groove 60.

Producing the retaining ring 22 so that it matches in shape the walls delimiting the recess 52 makes it possible to mount it in a single operation. Specifically, after deformation of the retaining ring 22, the lateral wall 53 of the recess 52 of the spacer is used as a reference surface in order to rest the collar 64 of a shape matching that of the ring, the positioning of the said ring against the shoulder 51 then being obtained simply by axial pushing in a continuous movement. In the mounted position, the retaining ring 22 can then resume its initial shape by elasticity so as to form a retaining clip for the attachment screw 20.

Moreover, with such a mounting of the retaining ring 22 inside the recess 52 of the spacer 18, no axial force is applied to the spacer when the ring is put in place, notably on the radial surface 49. Therefore, it is possible to provide relatively large adjustment tolerances between the cylindrical portion 42 of the spacer and the internal ring 30 of the rolling bearing without making arrangements to hold the said rolling bearing fixedly against the shoulder 46 during the mounting operation.

In the embodiment illustrated, the retaining ring is suitable for extending partly inside the groove arranged on the attachment screw between the smooth portion and the threaded portion. Alternatively, it is also possible, without departing from the context of the present invention, to provide an attachment screw without such a groove, the retaining ring having an internal diameter smaller than the diameter of the threaded portion of the screw then allowing the relative axial retention of the spacer and the said screw by friction. The use of a groove is however preferable because that makes it possible to obtain a radial interference between the edges of the groove and the retaining ring in order to immobilize the screw relative to the spacer.

By virtue of the invention, it is possible to manufacture and assemble simply, economically and easily an assembly consisting of the pulley, the rolling bearing, the attachment screw and the spacer, this assembly then being able to be transported without risk of separation of these elements and being ready to be attached to the associated support.

We claim:

1. A pulley device for a belt or chain tensioning or guide roller, the device comprising:
   a pulley;
   a rolling bearing comprising an internal ring, an external ring, and a row of rolling elements arranged between the internal ring and the external ring;
   an attachment member including a smooth portion and a threaded portion with an outer diameter;
   a spacer having an exterior surface and an interior surface extending axially therethrough, wherein a segment of the interior surface defines an elongated bore, wherein the elongated bore segment interior surface engages with the smooth portion of the attachment member and the exterior surface engages with the rolling bearing to provide adequate and independent radial support therebetween, and a transverse mounting surface disposable against an external element; and
   a retaining ring disposed on the attachment member and configured to retain the attachment member axially relative to the spacer, the retaining ring having an inner diameter lesser than the outer diameter of the threaded portion and less than an inner diameter of the elongated bore when the retaining ring is separate from the attachment member and an opening such that the ring is radially deflectable,
   wherein engagement between the elongated bore and the smooth portion extends to each side of a plane perpendicular to an axis of rotation of the rolling bearing and located through a center of the row of rolling elements, and
   wherein the elongated bore contacts the smooth portion of the attachment member on each side of the plane and the outer surface of the attachment member engages with the internal ring on each side of the plane.

2. The device as recited in claim 1 wherein the spacer has a recess extending from the mounting surface, the recess being partially defined by a generally frustoconical surface tapering outwardly toward the mounting surface, the retaining ring being mounted within the recess.

3. The device as recited in claim 2 wherein the retaining ring is formed so as to substantially match the shape of the recess.

4. The device as recited in claim 2 wherein the recess is partially defined by a shoulder extending generally radially inwardly from the frustoconical surface and the retaining ring is disposed generally against the shoulder.

5. The device as recited in claim 4 wherein the retaining ring includes a radial portion disposed axially against the shoulder and an oblique collar extending generally radially outwardly from the radial portion and disposable generally against the frustoconical surface.

6. The device as recited in claim 1 wherein the attachment member has an annular groove and the retaining ring has a radial protrusion disposed in the attachment member groove.

7. The device as recited in claim 6 wherein the attachment member groove has opposing lateral edges and the retaining ring is configured to interfere radially with at least one lateral edge of the groove.

8. The device as recited in claim 1 wherein the spacer extends in axial protrusion relative to the pulley.

9. The device as recited in claim 1 wherein the spacer has a generally cylindrical shape.

10. The device as recited in claim 1 wherein the retaining ring is formed of at least one of a synthetic material and a metallic material.

11. The device as recited in claim 1 wherein the rolling bearing has opposing axial sides, the spacer is disposed against one axial side of the bearing, and the attachment member further includes a clamping head disposable against the other axial side of the bearing.

12. A pulley device for a belt or chain tensioning or guide roller, the device comprising:
a pulley;
a rolling bearing comprising an internal ring, an external ring, and a row of rolling elements arranged between the internal ring and the external ring;
an attachment member including a smooth portion defining a smooth portion diameter, a threaded portion defining an outer thread diameter, and an annular groove having a groove diameter that is smaller than the outer thread diameter;
a spacer having an exterior surface, an interior surface extending axially therethrough, and a transverse mounting surface, wherein a segment of the interior surface defines an elongated bore, wherein the elongated bore segment interior surface engages with the smooth portion of the attachment member and the exterior surface engages with the rolling bearing to provide adequate and independent radial support therebetween, and the transverse mounting surface is disposable against an external element;
a recess extending inward from the mounting surface, the recess being partially defined by a generally frustoconical surface tapering outwardly toward the traverse mounting surface, the retaining ring being mounted within the recess;
a retaining ring disposed on the attachment member and configured to retain the attachment member axially relative to the spacer, wherein the retaining ring having a generally C shape comprising an internal radial portion having an inner diameter defining an opening, the internal radial portion is extended at a large-diameter edge by an oblique external collar widening towards the outside forming a frustum shape, wherein, in a free state, the inner diameter of the radial portion is greater than the outer diameter of the groove of the attachment member and slightly less than the diameter of the elongated bore, slightly less than the diameter of the smooth portion, and slightly less than the threaded portion 58 of the attachment member, wherein the ring is radially deflectable,
wherein a contacting surface of the retaining ring is formed to substantially match the shape of the recess,
wherein engagement between the elongated bore and the smooth portion extends to each side of a plane perpendicular to an axis of rotation of the rolling bearing and located through a center of the row of rolling elements, and
wherein the elongated bore contacts the smooth portion of the attachment member on each side of the plane and the outer surface of the attachment member engages with the internal ring on each side of the plane.

13. The device as recited in claim 12 wherein the recess is partially defined by a shoulder extending generally radially inwardly from the frustoconical surface and the retaining ring is disposed generally against the shoulder.

14. The device as recited in claim 13 wherein the retaining ring includes a radial portion disposed axially against the shoulder and an oblique collar extending generally radially outwardly from the radial portion and disposable generally against the frustoconical surface.

15. The device as recited in claim 12 wherein the spacer extends in axial protrusion relative to the pulley.

16. The device as recited in claim 12 wherein the spacer has a generally cylindrical shape.

17. The device as recited in claim 12 wherein the retaining ring is formed of at least one of a synthetic material and a metallic material.

18. The device as recited in claim 12 wherein the rolling bearing has opposing axial sides, the spacer is disposed against one axial side of the bearing, and the attachment member further includes a clamping head disposable against the other axial side of the bearing.

* * * * *